United States Patent
Holl et al.

(10) Patent No.: US 6,891,180 B2
(45) Date of Patent: May 10, 2005

(54) CAMERA SYSTEM FOR EDITING DOCUMENTS

(75) Inventors: Norbert Holl, Germering (DE); Florian Holzner, Wessling (DE); Johann Schiessl, Haar (DE); Bernd Wunderer, München (DE)

(73) Assignee: Giesecke & Devrient GmbH, Munich (DE)

( * ) Notice: Subject to any disclaimer, the term of this patent is extended or adjusted under 35 U.S.C. 154(b) by 260 days.

(21) Appl. No.: 10/168,545

(22) PCT Filed: Jan. 2, 2001

(86) PCT No.: PCT/EP01/00009
§ 371 (c)(1),
(2), (4) Date: Oct. 23, 2002

(87) PCT Pub. No.: WO01/50735
PCT Pub. Date: Jul. 12, 2001

(65) Prior Publication Data
US 2003/0132402 A1 Jul. 17, 2003

(30) Foreign Application Priority Data
Jan. 3, 2000 (DE) .......................................... 100 00 030

(51) Int. Cl.[7] ................................................ G06K 5/00
(52) U.S. Cl. .................... 250/556; 250/553; 250/578.1; 250/216; 359/853; 356/71; 382/112; 382/135; 382/137
(58) Field of Search ............................. 250/216, 578.1, 250/559.11, 552, 553, 556; 359/853; 283/72, 85, 901, 902; 209/576, 577, 587, 588; 382/112, 135, 137, 321, 140; 356/71

(56) References Cited

U.S. PATENT DOCUMENTS

| | | |
|---|---|---|
| 4,644,155 A | 2/1987 | Mochizuki et al. |
| 4,814,630 A | 3/1989 | Lim |
| 5,027,424 A | 6/1991 | Yamazaki et al. |
| 5,585,616 A * | 12/1996 | Roxby et al. ........... 235/462.06 |
| 5,974,162 A * | 10/1999 | Metz et al. .................. 382/124 |
| 6,061,121 A * | 5/2000 | Holl et al. ..................... 356/71 |
| 6,101,266 A * | 8/2000 | Laskowski et al. ......... 382/135 |
| 6,166,832 A | 12/2000 | Fujimoto |
| 6,509,955 B2 * | 1/2003 | Mei et al. ...................... 355/53 |
| 6,778,276 B2 * | 8/2004 | Bruner et al. ............... 356/417 |

FOREIGN PATENT DOCUMENTS

| | | |
|---|---|---|
| DE | 195 17 194 A1 | 11/1996 |
| DE | 195 35 098 A1 | 3/1997 |
| DE | 198 20 057 A1 | 11/1999 |
| EP | 0 465 768 A2 | 1/1992 |
| EP | 0 871 319 | 10/1998 |
| EP | 1 176 435 A1 | 1/2002 |

OTHER PUBLICATIONS

*IBM Technical Disclosure Bulletin*, vol. 37, No. 07, Jul. 1994, p. 233–234.

* cited by examiner

*Primary Examiner*—David Porta
*Assistant Examiner*—Davienne Monbleau
(74) *Attorney, Agent, or Firm*—Bacon & Thomas PLLC

(57) ABSTRACT

A camera system (2) for strip-shaped exposure of a bank note (BN) having good optical properties as well as a compact construction has, symmetrically to an optical axis (OA), mirror assemblies (4a, 4b) of elliptical cross section each extending in the direction of the illuminated strip, light sources formed by LED arrays (6a, 6b), an imaging optic in the form of a SELFOC® lens assembly (8), and a photodetector array (12) onto which the illuminated strip of the bank note (BN) is imaged by the SELFOC® lens assembly (8) in a 1:1 ratio.

12 Claims, 4 Drawing Sheets

CAMERA SYSTEM FOR EDITING DOCUMENTS

BACKGROUND

This invention relates to a camera system for the processing of documents, in particular for reflectance and/or transmittance measurement of documents.

Such a camera system can be used for example for evaluating documents, e.g. bank notes. In usual bank note processing devices, an illumination device having a light source and a mirror assembly is used to illuminate the document to be judged, and the light reflected by the document is directed onto a detector, for example a CCD sensor, to obtain digital images of the document. The image signals can then be evaluated for various purposes.

Such camera systems are generally formed for reflectance or transmittance measurement of documents, in particular bank notes. For the light reflected by the bank note to be detected as faithfully as possible, an optic is located in the prior art between the object plane traversed by the bank note and the detector for transferring an image of the illuminated area—usually a strip—of the bank note onto the detector in reduced size. A disadvantage of known camera systems and the optics used therein is the great distance between object and detector. Furthermore, the reduction in size leads to distortions in the image generated by the optic on the detector, which require correction for useful image signals to be obtained. The usually employed light sources, for example fluorescent lamps, have only a relatively short life and must thus be replaced at certain time intervals.

SUMMARY

The invention is based on the problem of stating a camera system of the above-mentioned kind that is characterized by good optical properties while having a compact construction.

This problem is solved in a camera system with the abovementioned features if the mirror assembly is disposed around the detector, the light source is formed as an LED array, and the optic is formed for a 1:1 image transfer of the illuminated place on the document onto the detector.

The mirror assembly built around the detector (for example a CCD sensor) creates the possibility for a compact structure of the camera system, whereby the light source formed as an LED array guarantees a long life of the illumination device as well as sufficient luminosity of a suitable wavelength. The 1:1 image transfer permits the optic to provide an image very largely free from distortions on the detector, thus making elaborate correction unnecessary.

If, as is preferred, the camera system is used for processing bank notes, in particular examining bank notes, the light-emitting diode array is formed to emit magenta light, a mixture of wavelengths of red and blue light. Light of said wavelengths causes a strengthening of the green contrast, i.e. a strengthening of the color used for executing a large part of the writing on bank notes. However, a suitable application of red, green and blue light-emitting diodes makes it fundamentally possible to produce any color required for illuminating the bank notes or documents to be examined.

As is known per se, the total camera system is formed for strip-shaped illumination of a document and strip-shaped recording of the light coming from the document. For examination of documents, the documents are moved past before a window of the camera system in an object plane. In a preferred embodiment of the invention, the mirror assembly of the illumination device consists in cross section of two elliptical sections, each elliptical section having an LED array associated therewith. The LED arrays emit light at a certain angle of radiation. The mirror assembly and the angles of radiation of the LEDs can be coordinated well with each other so that high luminous efficiency is attained by the LEDs.

The detector can be for example a CCD sensor, but preferably consists of photodetector arrays, which are available on the market as CMOS photodetector chips. Depending on the desired resolution, such CMOS photodetector chips can be disposed in a larger or smaller number on a given surface area.

The inventive camera system is equally suitable for reflectance measurement and transmittance measurement as well as for combined measurement, the illumination device used for reflectance measurement being also used for transmittance measure-measurement. For reflectance measurement, that is, for measuring the light reflected by the document, a detector and the optic are located between the LED arrays and the document. For transmittance measurement, an optic and a detector are located on the side of the object plane facing away from the illumination device, whereby said devices provided for transmittance measurement can be provided additionally or alternatively to the optic and detector for reflectance measurement.

For transmittance measurement, a dark field sensor can be provided, on the one hand, and a light field sensor, on the other hand. With the dark field sensor, optic and detector are located at a place offset from the transmittance beam path. For light field measurement, optic and detector are located in the beam path of the light that has passed through the document.

In almost all documents, the image on one side of the document differs from that on the other side of the document. To obtain extensive data from the document within a short time, the invention provides two reflectance measurement devices and two transmittance measurement devices. It is specially provided to dispose an illumination device with optic and detector on the first side of the object plane for a first reflectance measurement and an optic and detector on the second side of the object plane for a first transmittance measurement, the transmittance measurement making use of the illumination device associated with the reflectance measuring device. Such an assembly is provided once again, offset by 180° (π) from the optical plane. The bank note is then subjected in one run to reflectance measurement on both sides, furthermore it is subjected to transmittance measurement on both sides, whereby a light field measurement, on the one hand, and a dark field measurement, on the other hand, are performed for both transmittance measurements.

A special feature of the invention is the use of an optic that delivers a 1:1 image transfer of the illuminated strip of the bank note onto the detector. Such optics have been known for some time. A preferred optic for the present invention is one in the form of lenses known under the trade name "SELFOC®." SELFOC® lenses are fiber bundle assemblies that deliver an upright 1:1 image of the object.

The special features of the invention explained above, i.e. an illumination device with an in particular elliptical mirror assembly and double LED array, a SELFOC® lens assembly generating 1:1 image transfer, and a photodetector array in the image plane of the lens assembly, obtain a compactly built, easily and cheaply produced camera system with good optical properties. Since the image arising in the image plane of the lens assembly is very largely distortion-free with a 1:1 enlargement with respect to the object plane, no corrections are required. The LED arrays have long life; in particular the LEDs can be chosen so as to obtain the most favorable color of illumination light for the particular case of application.

The inventive camera system contains components known from the prior art. A peculiarity is the mirror assembly used. Said mirror assembly can be coordinated with the other components, in particular the LED arrays and the overall depth of the illumination device with respect to the object plane by known calculation methods and software. The mirror surfaces can be milled from metal blocks by numerically controlled machines, or else made of mirror-surfaced, transparent material. In the latter case, entrance and exit surfaces can be provided with a lens made of the transparent material.

In the following, some examples of the invention will be explained in more detail with reference to the drawings, in which:

DETAILED DESCRIPTION OF VARIOUS EMBODIMENTS

Figure 1:
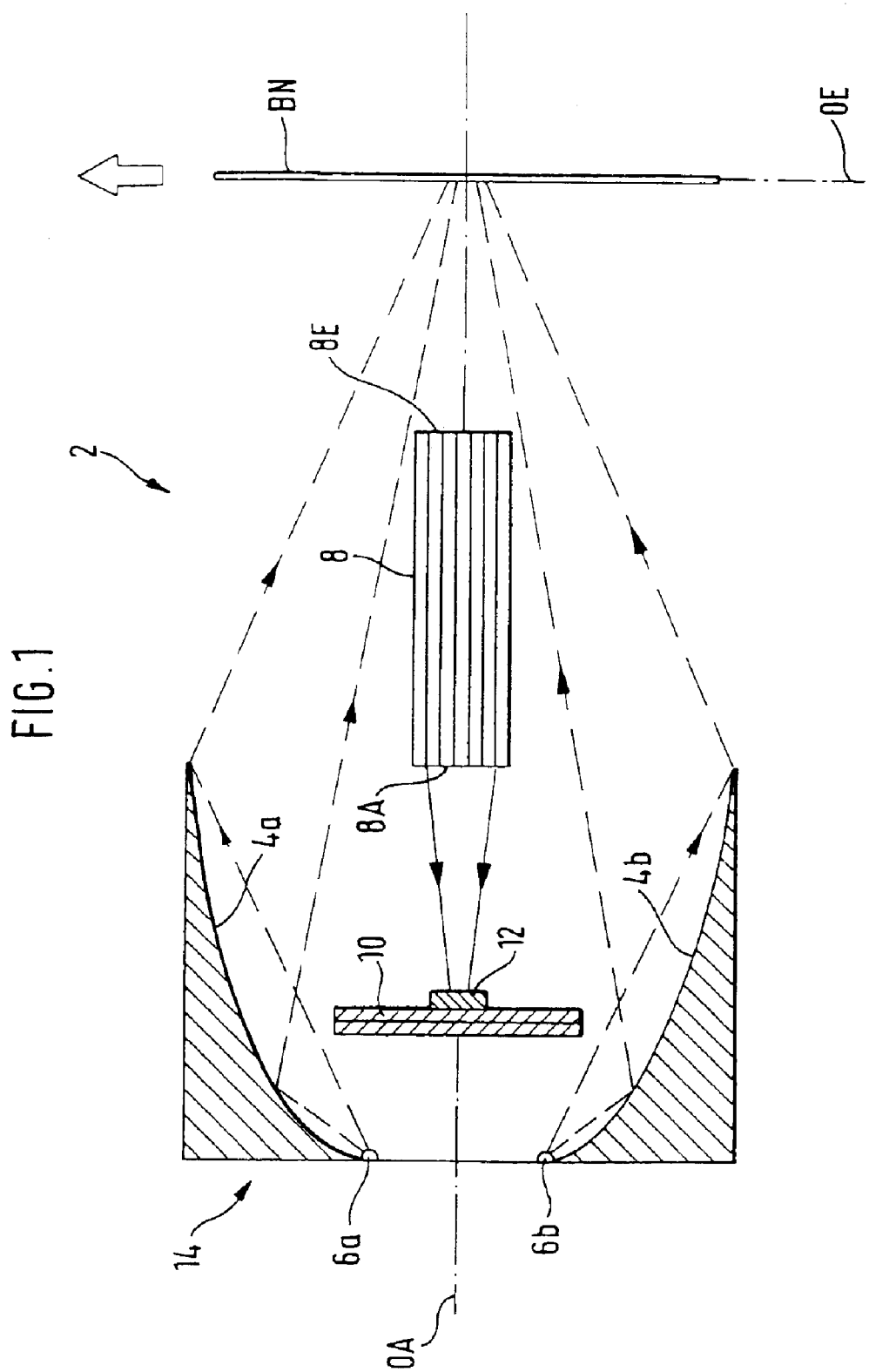
FIG. 1 shows a sectional view through a first embodiment of an inventive camera system for reflectance measurement of bank notes, the sectional plane extending perpendicular to a plane defined by optical axes of an assembly that extends perpendicular to the plane of projection with a constant cross section.

FIG. 1 shows a first embodiment of camera system 2 according to the invention. The sectional view shows a camera system for performing a reflectance measurement in bank note BN transported in object plane OE from the bottom to the top in the direction of the arrow.

During transport of bank note BN past a window of camera system 2, said window being about 0.5 millimeters wide in the transport direction and not shown in detail here, a strip is illuminated on the left side of bank note BN in FIG. 1. Light reflected by the bank note is imaged onto a photodetector array. Illumination of bank note BN is done using illumination device 14 disposed symmetrically to optical axis OA of the camera system. In the sectional view shown in FIG. 1, optical axis OA corresponds to a plane of symmetry perpendicular to the plane of projection and containing optical axis OA.

Illumination device 14 contains mirrors 4a, 4b of elliptical cross section and linearly disposed LED arrays (light-emitting diode arrays) 6a, 6b, said mirrors and LED arrays being disposed on each side of optical axis OA.

Light concentrated in the form of a strip on bank note BN by illumination device 14 according to the directions of the arrows is reflected by bank note BN and passes into entrance side 8E of SELFOC® lens assembly 8. The light leaves said lens assembly via light exit surface 8A and is imaged onto the surface of photodetector array 12 on circuit board 10. The photodetector array is an assembly of CMOS photodetector chips, which can be disposed on board 10 with selectable resolution. For example, in a low-resolution detector the chips are disposed on board 10 at a pixel center distance of 1 millimeter, while for high resolution the center distance of the pixels of detector 12 is preferably 0.2 millimeters.

The drawing does not show the circuit elements for driving illumination device 14 and detector 12 and for processing the image signals obtained from detector 12. Said circuit devices can be formed as in conventional camera systems of a comparable type in a way obvious to the expert.

As is evident from FIG. 1, the light-emitting diodes of LED arrays 6a and 6b have certain angles of radiation adapted to mirrors 4a and 4b having an elliptical cross section, an area free from illumination light remaining in the center area around optical axis OA for receiving SELFOC® lens assembly 8 and board 10 with detector 12. Lens assembly 8 formed as a fiber optic system permits a 1:1 image transfer of the illuminated strip on bank note BN onto the photosensitive surface of detector 12. The image is practically free from distortions. No correction is required. As one can see, the total structure is compact and simple, so that the camera system can be produced in a compact construction with low production effort. The use of light-emitting diodes in the illumination device guarantees a long life of the illumination device.

Suitable choice of the light-emitting diodes of LED arrays 6a and 6b permits the wavelength of the light directed onto the document by illumination device 14 to be optimally coordinated with the nature of the document to be tested, here bank note BN. In many bank notes, the writing is executed mainly in green ink. The best possible contrast is therefore obtained if the light-emitting diodes of LED arrays 6a and 6b deliver magenta light, i.e. have elements for red and blue light in a ratio of red to blue of 1:2, according to the embodiments of the invention described here.

Figure 2:
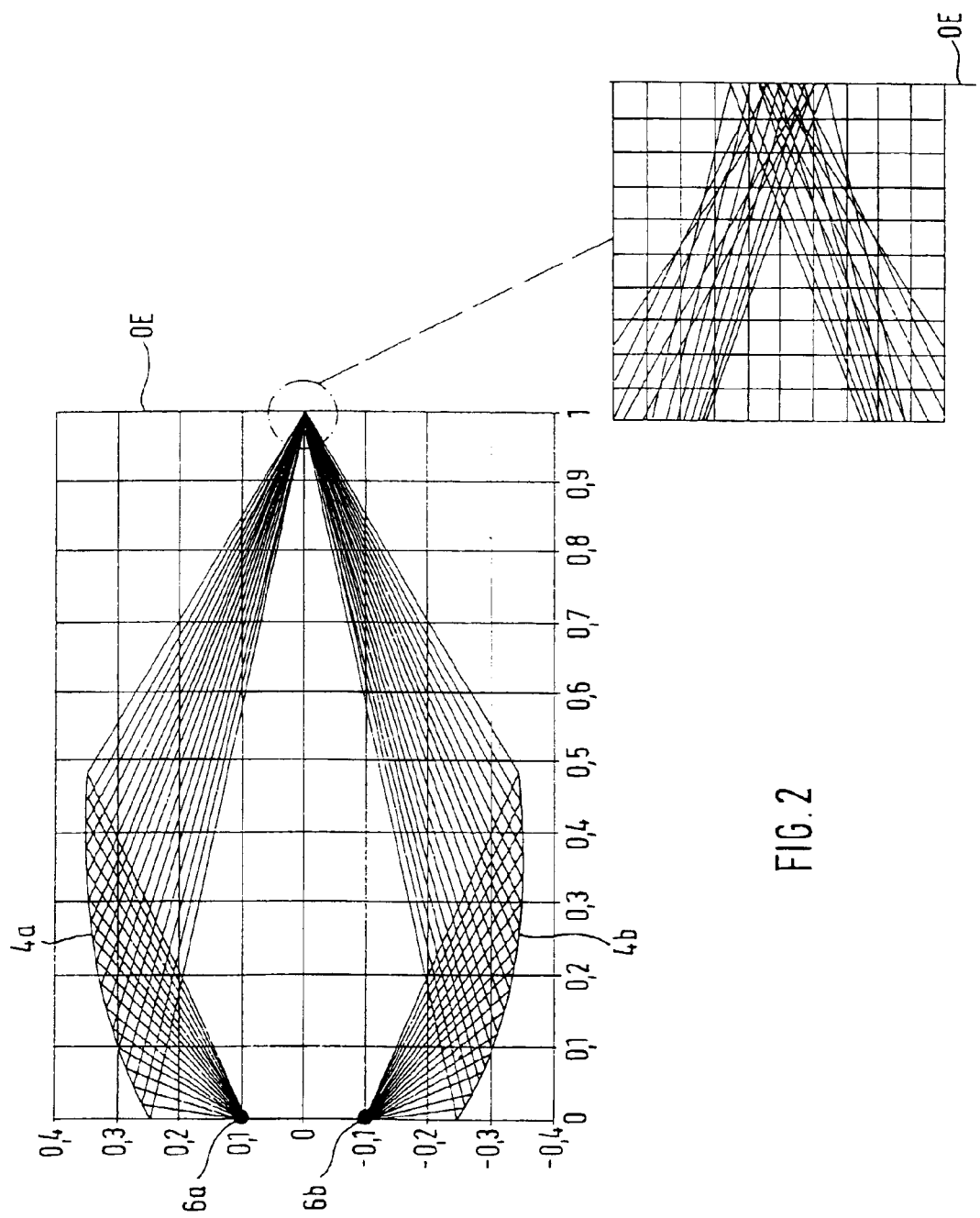
FIG. 2 shows a schematic view of the beam path of an illumination device as used in the camera system shown in FIG. 1.

FIG. 2 shows schematically the beam path of the illumination light. The two LED arrays are disposed at the coordinates x=0 and y (6a)=0.1 and y (6b)=−0.1 in the grid shown in FIG. 2.

The cross sections of mirrors 4a and 4b are such that the beam pencils overlap at the place of illumination in object plane OE, as shown enlarged at the bottom right in FIG. 2. The overlapping beams result in a defined, largely constant intensity distribution of light across the width of the illuminated strip shown in cross section in FIG. 2.

Figure 3:
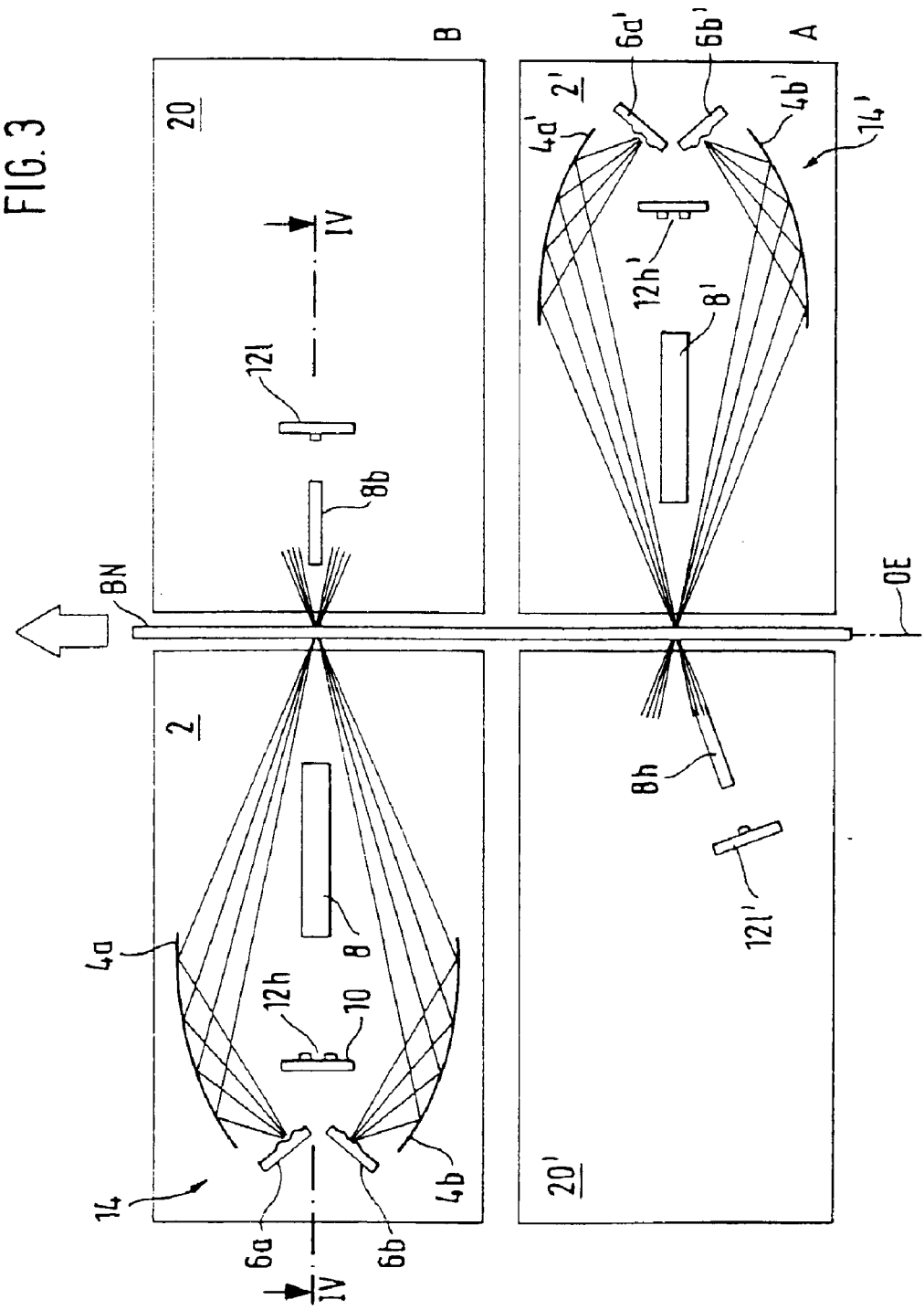
FIG. 3 shows a schematic view of a further embodiment of an inventive camera system for two reflectance measurements and two transmittance measurements.

FIG. 3 shows a further, preferred embodiment of the inventive camera system. With the camera system shown in FIG. 3, first and second reflectance measurements and first and second transmittance measurements are performed directly one after the other with bank note BN running upward according to the arrow in the drawing.

The top left in FIG. 3 shows camera system 2 similar to the camera system shown in FIG. 1 as a partial camera system of a multiple measuring assembly.

The elements shown in FIG. 1 can be readily recognized in partial camera system 2 on the top left in FIG. 3. The detector here is a high-resolution detector designated with reference sign 12h. In the shown example, detector 12h in the form of a CMOS photodetector chip array has a resolution of 0.2 millimeters, that is, the pixels of the chip are disposed at a center distance of 0.2 millimeters.

Light directed by illumination device 14 of partial camera system 2 in a strip shape onto bank note BN for reflectance measurement is reflected onto photodetector 12h via SELFOC® lens assembly 8 in the way already shown in FIG. 1. The photodetector delivers image signals to an evaluation circuit not shown here.

Furthermore, light from illumination device 14 used for reflectance measurement is partly transmitted through bank note BN. This results in a transmitted light distribution on the side facing away from illumination device 14 of object plane OE traversed by bank note BN, whereby two intensity peaks of the transmitted light, indicated in the Figure by beam pencils on the right side of bank note BN, are present due to the beam path generated by illumination device 14.

Partial camera system 20 shown on the top right in FIG. 3 is used for a second transmittance measurement, here in the form of a dark field measurement. For dark field measurement, SELFOC® lens assembly 8b is located between the beam pencils of the transmitted light for imaging light from the "dark field" onto the surface of low-resolution detector 12l. Detector 12l is formed by an array of CMOS photodetector chips, which are disposed on a board here according to a resolution of 1 millimeter, that is, at a pixel center distance of 1 millimeter.

Partial camera systems 2 and 20 shown at the top in FIG. 3 are used for a second reflectance measurement and a second transmittance measurement.

Assembly B comprising partial camera systems 2 and 20 is preceded in time and space with respect to the transport direction of bank note BN by assembly A which is formed similarly to assembly B but offset therefrom by 180° with respect to object plane OE.

Assembly A comprises two partial camera systems, namely partial camera system 2' for a first reflectance measurement and partial camera system 20' for a first transmittance measurement.

Partial camera system 2' is formed identically to partial camera system 2 shown on the top left in FIG. 3. The components for partial camera system 2' are provided with reference signs with prime symbols.

Partial camera system 20' is formed similarly to partial camera system 20 but is used, unlike the latter, for light field transmittance measurement. Accordingly, SELFOC® lens assembly 8h is located in the center of one beam pencil of transmitted light, the output of said SELFOC® lens assembly 8h being faced by low-resolution detector 12l'. Elements 8h and 12l' correspond to elements 8b and 12l of partial camera system 20 on the top right in FIG. 3, only their location with respect to the transmitted light is intended for a light field measurement.

Figure 4:
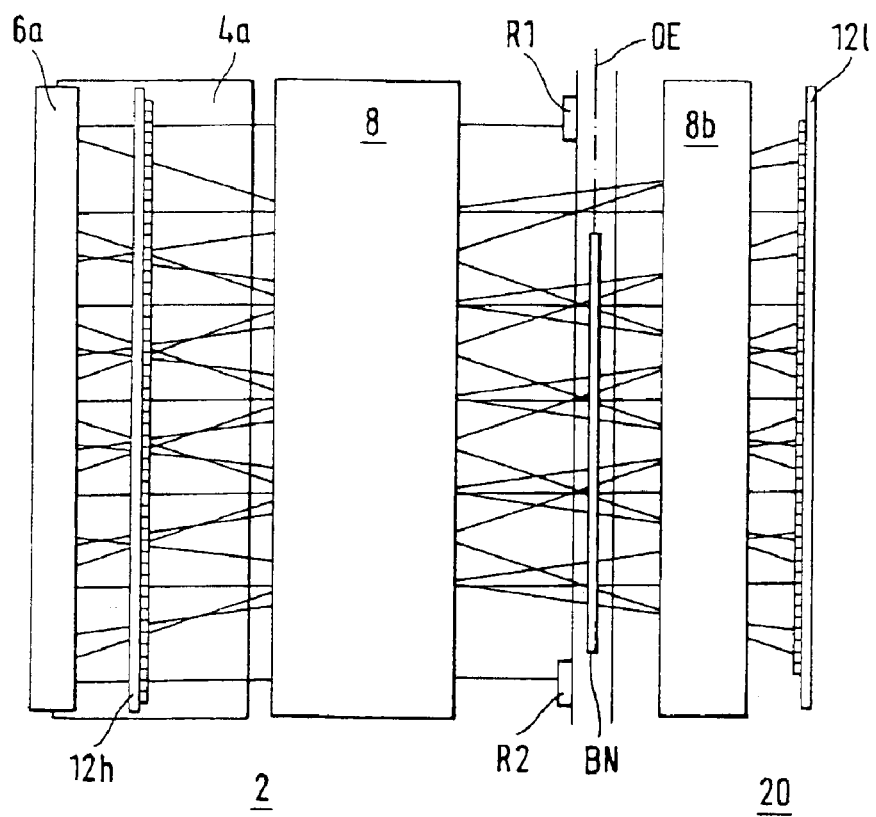
FIG. 4 shows a sectional view of the camera system shown in FIG. 3 corresponding to cutting line IV—IV in FIG. 3.

FIG. 4 shows the structure shown in cross section in FIG. 3 in a sectional view according to cutting line IV—IV in FIG. 3. One can see from the left to the right LED array 6a, mirror 4a, detector 12h, SELFOC® lens assembly 8, bank note BN traversing object plane OE (in FIG. 4 bank note BN moves perpendicular out of the plane of projection), SELFOC® lens assembly 8b disposed to the right of object plane OE, with associated detector 12l.

FIG. 4 shows some beam paths of illumination light, reflectance light and transmitted light. As one can see, the light distribution in the area of bank note BN is substantially homogeneous. At the upper and lower edges of bank note BN in FIG. 4 the light begins to grow weaker. On both sides of moving bank note BN, that is, at the top and bottom in FIG. 4, there are reference markings R1 and R2 that are used for generating a reference signal for adjusting measurements. Reference markings R1 and R2 can be formed e.g. as white reference surfaces. Light reflected by reference markings R1 and R2 is received by detector 12h and the reference signal derived therefrom.

What is claimed is:

1. A camera system for processing documents for measurement of reflectance and/or transmittance of documents, including a first camera assembly comprising:
    a first illumination device for illuminating a document traversing an object plane, and including a first light source and a first mirror assembly associated with the first light source for directing light emitted by the first light source onto the document;
    a first optic for imaging light reflected and/or transmitted by the document onto an image plane;
    a first detector disposed in the image plane;
    wherein the first mirror assembly is disposed around the first detector and the first light source,
    the first light source comprises an LED array, and
    the first optic is formed for 1:1 image transfer of the illuminated place on the document onto the first detector;
    wherein the first detector, the first light source and the first optic are positioned to permit uninterrupted transmission of light reflected by the first mirror assembly onto the document.

2. A camera system according to claim 1, wherein the first illumination device is arranged for strip-shaped illumination of the document, and the first optic and the first detector are disposed symmetrically with respect to a plane that is perpendicular to the document and determined by the set of optical axes of the first optic.

3. A camera system according to claim 2, wherein the first mirror assembly comprises two sections having an elliptical profile, and the first light source comprises two LED arrays in linear form.

4. A camera system according to claim 3, wherein the first detector and the first optic are disposed between the LED arrays and the object plane for reflectance measurement.

5. A camera system according to claim 3, wherein a second optic and a second detector are disposed on a side of the object plane facing away from the illumination device for transmittance measurement.

6. A camera system according to claim 5, wherein the second optic used for transmittance measurement and the the second detector are disposed in the transmitted beam path or laterally offset from the transmitted beam path.

7. A camera system according to claim 5, wherein the second optic and the second detector are disposed both in the transmitted beam path and laterally offset therefrom for transmittance measurement.

8. A camera system according to claim 2, further comprising a second camera assembly including a second illumination device with a third optic and a third detector disposed on a first side of the object plane for a second reflectance measurement, and a fourth optic and a fourth detector disposed on a second side of the object plane for measuring light coming from the second illumination device on the first side for a second transmittance measurement; wherein the first camera is rotated by 180° relative to the second camera assembly with respect to the object plane and provides a first reflectance measurement and a first transmittance measurement.

9. A camera system according to claim 8, wherein the first camera assembly includes a first transmittance measuring device and the second camera assembly includes a second transmittance measuring device, the first and second transmittance measuring devices being arranged for light and dark field measurement.

10. A camera system according to claim 1, wherein the first optic is formed as a fiber optic system.

11. A camera system according to claim 10, wherein the fiber optic system is a fiber bundle arranged to deliver an upright 1:1 image of the document.

12. A camera system according to claim 1 is adapted for use with bank notes, and wherein the LED array of the first light source is arranged to emit magenta light as a mixture of the wavelengths of red and blue light.

* * * * *